United States Patent
Zhang et al.

(10) Patent No.: US 7,567,410 B1
(45) Date of Patent: Jul. 28, 2009

(54) FLEXURE INCLUDING A HEAT SINK AND A DIELECTRIC LAYER UNDER TRACE TERMINATION PADS

(75) Inventors: Yiduo Zhang, Cupertino, CA (US); Drew B. Lawson, Los Gatos, CA (US); Tzong-Shii Pan, San Jose, CA (US); Darrell D. Palmer, Roseville, CA (US); Yih-Jen Chen, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 464 days.

(21) Appl. No.: 11/590,575

(22) Filed: Oct. 31, 2006

(51) Int. Cl.
*G11B 5/48* (2006.01)

(52) U.S. Cl. .................. 360/245.9; 360/245.3

(58) Field of Classification Search .............. 360/244.3, 360/245.3, 245.8, 245.9
See application file for complete search history.

(56) References Cited

U.S. PATENT DOCUMENTS

| | | | |
|---|---|---|---|
| 5,739,982 A | 4/1998 | Arya et al. | |
| 5,757,585 A | 5/1998 | Aoyagi et al. | |
| 5,956,208 A | 9/1999 | Kawazoe | |
| 6,198,599 B1 | 3/2001 | Senuma | |
| 6,349,017 B1 | 2/2002 | Schott | |
| 6,965,499 B1 * | 11/2005 | Zhang et al. | 360/234.8 |
| 6,993,824 B2 | 2/2006 | Childers et al. | |
| 7,006,330 B1 | 2/2006 | Subrahmanyam et al. | |
| 7,068,471 B1 * | 6/2006 | Bjorstrom et al. | 360/245.9 |
| 7,349,184 B2 * | 3/2008 | Erpelding | 360/245.8 |
| 2002/0057531 A1 | 5/2002 | Segar et al. | |
| 2003/0090839 A1 * | 5/2003 | Segar et al. | 360/245.9 |
| 2003/0147178 A1 * | 8/2003 | Yamaoka et al. | 360/245.9 |
| 2004/0027725 A1 * | 2/2004 | Pan et al. | 360/245.3 |
| 2005/0047023 A1 * | 3/2005 | Childers et al. | 360/245.9 |
| 2005/0141138 A1 | 6/2005 | Shiraishi et al. | |
| 2007/0247760 A1 * | 10/2007 | Hanya et al. | 360/245.5 |

* cited by examiner

*Primary Examiner*—Jefferson Evans
(74) *Attorney, Agent, or Firm*—Barcelo & Harrison, LLP

(57) ABSTRACT

A flexure is provided for a HGA suspension. The flexure includes a metal base layer, a trace layer, and a dielectric layer disposed between the trace and base layers. The metal base layer includes a heat sink portion. The trace layer includes a plurality of conductive traces, each conductive trace having a curved section that terminates in a trace termination pad. The dielectric layer includes a portion that underlies the trace termination pads and overlies the heat sink portion. The base layer and the dielectric layer each also include a window. The curved section of each conductive trace extends over the window of the base layer. The curved section of each conductive trace may at least partially extend over the window of the dielectric layer.

15 Claims, 5 Drawing Sheets

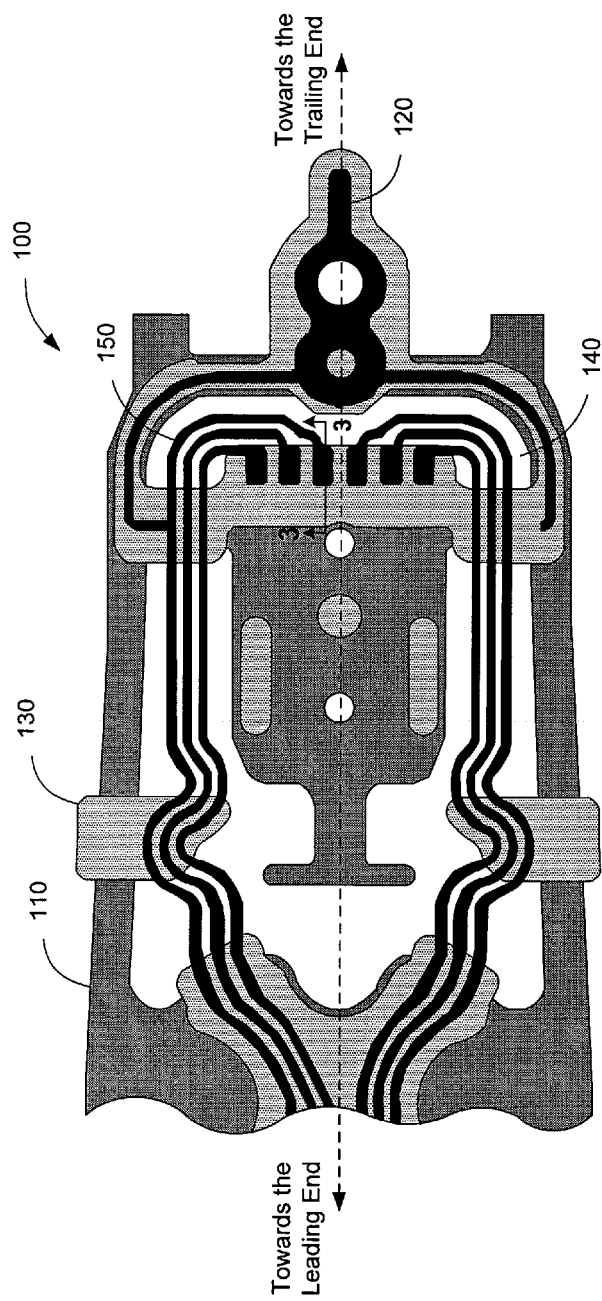
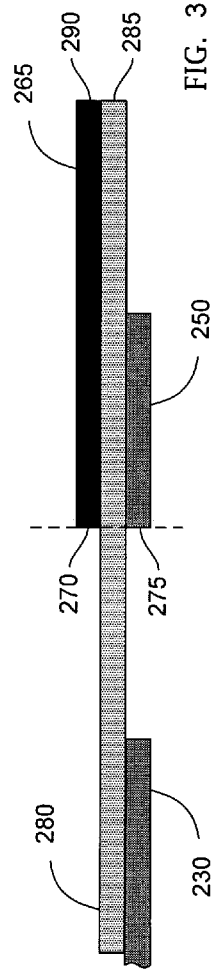
FIG. 1
FIG. 3

FLEXURE INCLUDING A HEAT SINK AND A DIELECTRIC LAYER UNDER TRACE TERMINATION PADS

BACKGROUND OF THE INVENTION

1. Field of the Invention

The present invention relates generally to the field of disk drives and more particularly to flexures of head gimbal assemblies thereof.

2. Description of the Prior Art

Disk drives store and retrieve data for digital electronic apparatuses such as computers. A typical magnetic disk drive comprises a head, including a slider and a transducer, in very close proximity to a surface of a rotatable magnetic disk. The transducer, in turn, includes a write element and/or a read element. As the magnetic disk rotates beneath the head, a very thin air bearing is formed between the surface of the magnetic disk and an air bearing surface of the slider. The write element and the read element can be alternately employed to write and read data while an actuator assembly positions the heads along desired magnetic "tracks" on the magnetic disk.

In order to keep the head properly oriented and at the correct height above the disk while in flight, disk drives employ a head gimbal assembly (HGA) that comprises the head and a suspension that further includes a load beam and a flexure that attaches the head to the load beam. The typical flexure is a layered structure that includes a thin metal support, electrical traces, and an insulating layer to keep the electrical traces from contacting the metal support. To electrically connect the head to the electrical traces during assembly, bonding pads of the head's transducer are connected to corresponding termination pads of the electrical traces on the flexure, for example by soldering.

One problem that arises during HGA assembly, when solder is used to connect bonding pads of the transducer to the termination pads on the flexure, is that the solder shrinks as it cools and solidifies. This creates a force that tends to pull the bonding pads and the termination pads towards one another. This force can cause the flexure to distort or solder bonds to fail, or both. A sufficiently distorted flexure may create a large enough pitch static angle (PSA) change in the orientation of the head that, when straightened during assembly, an unacceptably high residual pitch torque adversely affects the height at which the head flies above the disk.

SUMMARY

An exemplary flexure for a head/gimbal assembly suspension comprises a metal base layer, a trace layer disposed over the base layer, and a dielectric layer disposed between the trace and base layers. The metal base layer includes two outrigger beams, a first crossbeam disposed between the two outrigger beams at a trailing end of the base layer, a second crossbeam disposed between the two outrigger beams, a flexure tongue, including a slider mounting surface, extending from the second crossbeam, and a heat sink portion. The metal base layer also includes a base layer window disposed between the first and second crossbeams. The trace layer includes a plurality of conductive traces, each conductive trace having a curved section that terminates in a trace termination pad. Each trace termination pad has an edge disposed closest to the flexure tongue. The dielectric layer includes a portion underlying the edges of the trace termination pads and overlying the heat sink portion, and a dielectric layer window disposed between the first and second crossbeams of the base layer. The curved section of each conductive trace extends over the base layer window. An exemplary head/gimbal assembly comprises a suspension, as described above, and a head including a slider mounted on the flexure tongue of the suspension, and a transducer having bonding pads, each bonding pad electrically connected to a respective trace termination pad of the suspension.

BRIEF DESCRIPTION OF DRAWINGS

FIG. 1 shows a top view of an exemplary flexure for a head/gimbal assembly suspension according to an embodiment of the present invention.

FIG. 3 shows a cross-section along the line 3-3 in FIG. 1.

DETAILED DESCRIPTION OF THE INVENTION

Figure 4:
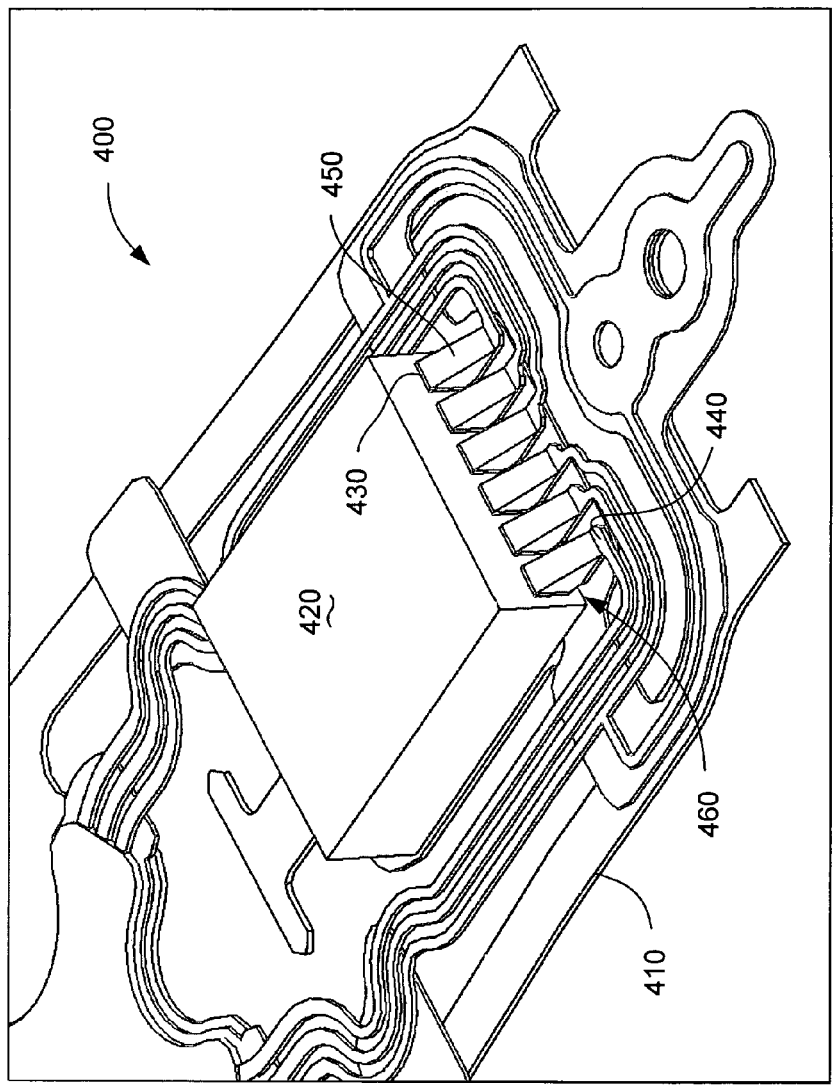
FIG. 4 shows a perspective view of an exemplary head/gimbal assembly according to an embodiment of the present invention.

FIG. 1 shows a top view of an exemplary head gimbal assembly (HGA) suspension 100 according to an embodiment of the present invention. The HGA suspension 100 comprises three layers, shown side-by-side in FIG. 2. Specifically, the HGA suspension 100 comprises a metal base layer 110, a trace layer 120 disposed over the base layer 110, and a dielectric layer 130 disposed between the trace layer 120 and the base layer 110. A cross-section along the line 3-3 in FIG. 1 is shown in FIG. 3. FIG. 4 shows a HGA 400, according to an exemplary embodiment of the present invention, comprising a HGA suspension 410 and a head 420. The base layer 110, trace layer 120, and dielectric layer 130 can be formed by conventional processes known in the art.

Figure 2:
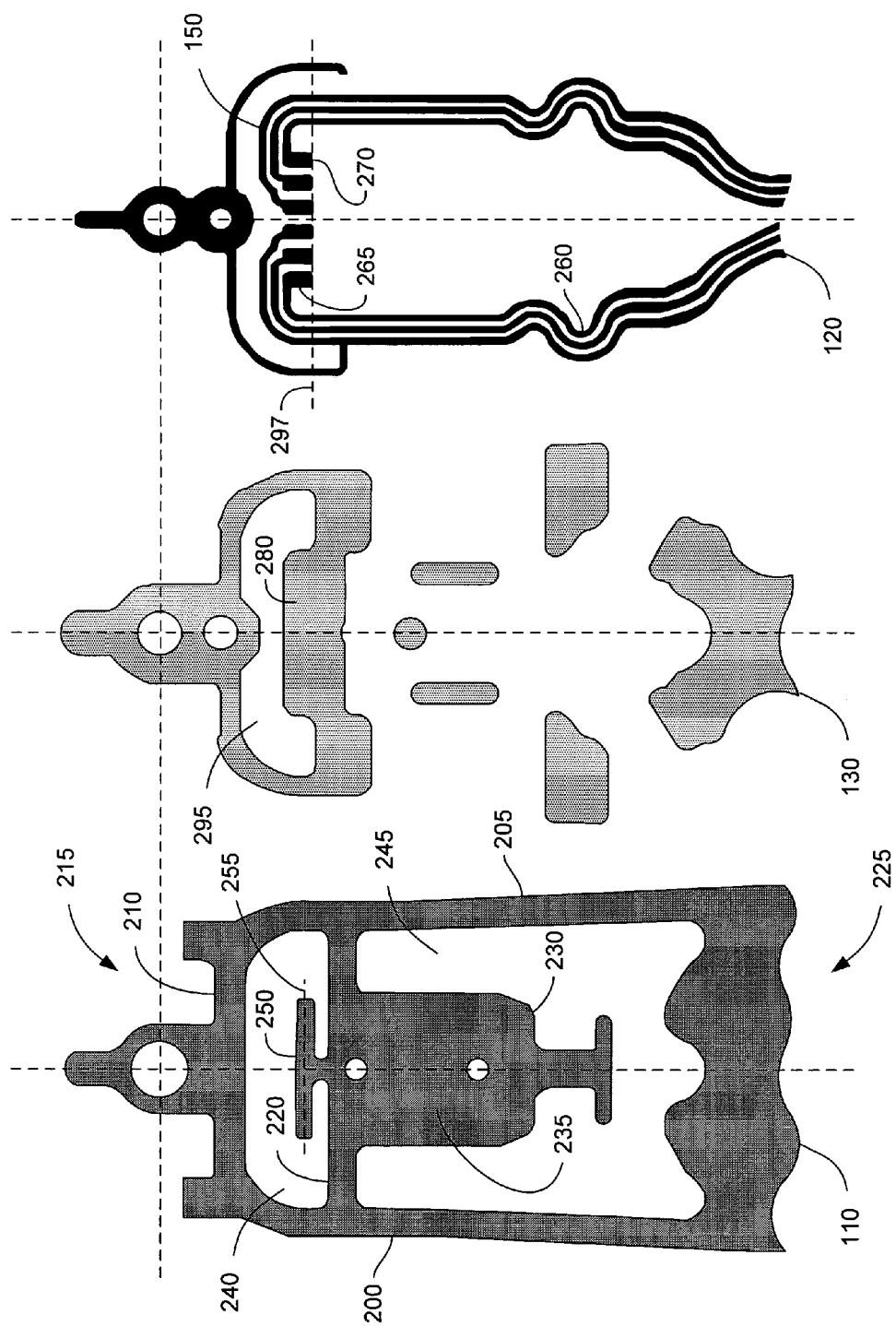
FIG. 2 shows a top view of each of three layers of the flexure of FIG. 1 set side by side.

Referring to FIG. 2, the base layer 110 comprises a metal such as stainless steel. In some embodiments, a thickness of the base layer 110 is in the range of about 10 μm to 25 μm, for example, 20 μm. The base layer 110 includes two outrigger beams 200, 205 and a first crossbeam 210 disposed between the two outrigger beams 200, 205 at a trailing end 215 of the flexure 100 and therefore also of base layer 110. The base layer 110 also includes a second crossbeam 220 disposed between the two outrigger beams 200, 205. The second crossbeam 220 is disposed, relative to the first crossbeam 210, towards a leading end 225 of the flexure 100. A flexure tongue 230 extends from the second crossbeam 220 in the direction of the leading end 225. The flexure tongue 230 includes a slider mounting surface 235 for attaching the slider of a head to the flexure 100.

The terms leading end 225 and trailing end 215, as used herein, are used in conformity with their conventional usage in the art. In their conventional usage, these terms take their meaning from the orientation of the head as secured to the flexure 100. As noted above, the head comprises a slider and a transducer. The side of the head that includes the transducer is designated as the trailing end of the head. These designations are extended to the flexure 100, and its sub-components, such that the end of the flexure that attaches to the load beam is the leading end of the flexure 100, while the free end of the flexure 100 is the trailing end of the flexure 100. In conformity with these terms, as used herein, "towards the leading end" and "towards the trailing end" designate opposing directions in the plane of the flexure 100 along a longitudinal axis thereof (see FIG. 1).

Two windows are defined in the base layer 110. A first window 240 is defined between the two crossbeams 210, 220 and the two outrigger beams 200, 205. A generally U-shaped second window 245, defined around the flexure tongue 230, separates the flexure tongue 230 from the two outrigger beams 200, 205.

Figure 5:
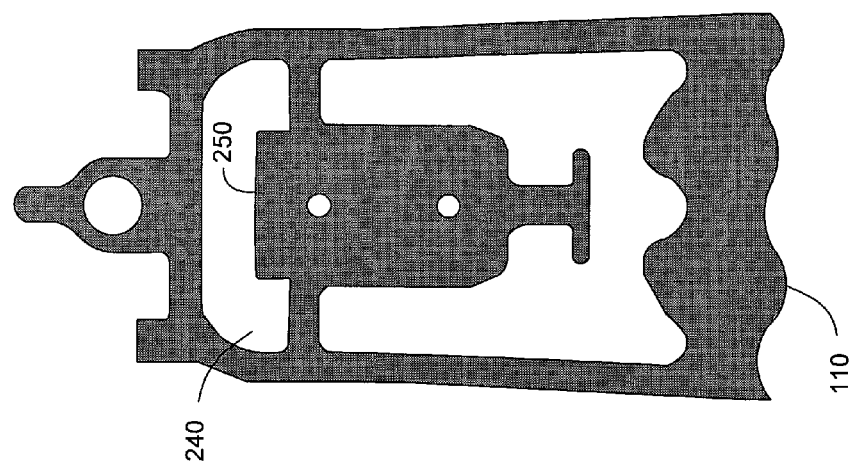
FIG. 5 shows a top view of an exemplary metal base layer according to an embodiment of the present invention.
Figure 6:
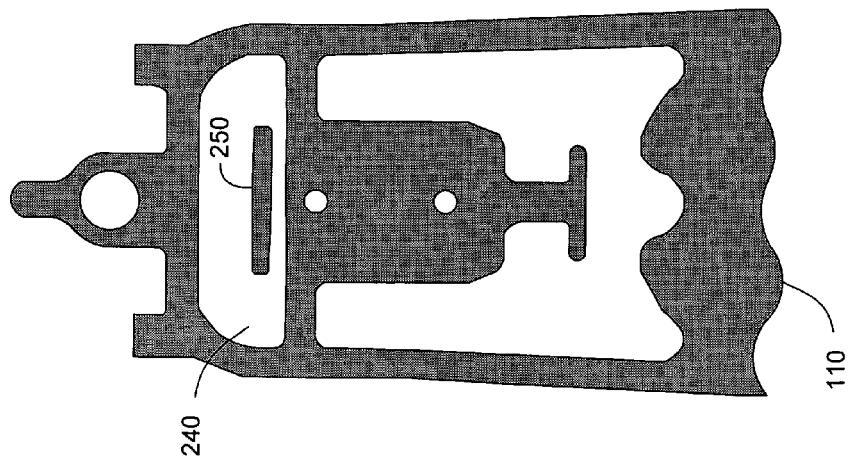
FIG. 6 shows a top view of an exemplary metal base layer according to another embodiment of the present invention.

Additionally, the base layer 110 includes a heat sink portion 250 disposed between the two crossbeams 210, 220 and separated from the first crossbeam 210 by the first window 240. As discussed in greater detail below, the heat sink portion 250 provides a heat sink during the process of forming the electrical interconnect between the trace termination pads and the bonding pads of the transducer, such as during soldering. In some embodiments, such as the one illustrated by FIG. 2, the heat sink portion 250 is shaped like a bar and characterized by a major axis 255 aligned parallel to the second crossbeam 220. In some embodiments, again as in FIG. 2, the heat sink portion 250 is attached to the second crossbeam 220 by a narrow isthmus. In other embodiments, such as the one shown in FIG. 5, the heat sink portion 250 is disposed as an island within the first window 240. In still other embodiments, such as the one shown in FIG. 6, the heat sink portion 250 takes the shape of a tab that extends from the second crossbeam 220 opposite the flexure tongue 230.

Returning to FIG. 2, the trace layer 120 includes a plurality of conductive traces 260 of a metal such as copper. In some embodiments, a thickness of the trace layer 120 is in the range of about 5 µm to 20 µm, for example, 12 µm. Each conductive trace 260 terminates in a trace termination pad 265, and each trace termination pad 265 has a leading edge 270 disposed closest to the flexure tongue 230. FIG. 3 shows a cross-section along the line 3-3 in FIG. 1 through one trace termination pad 265. The scale in FIG. 3 has been enlarged relative to the scale in FIG. 1 for clarity. The heat sink portion 250 underlies the trace termination pad 265, and in this embodiment has a leading edge 275 that is aligned with the leading edge 270 of the trace termination pad 265. In other embodiments, the leading edge 275 of the heat sink portion 250 is not aligned with the leading edge 270 of the trace termination pad 265. For example, the leading edge 275 of the heat sink portion 250 can be disposed towards the leading end 225 of the flexure 100 relative to the leading edge 270 of the trace termination pad 265. In some embodiments, such as the one illustrated by FIG. 6, the heat sink portion 250 extends as a tab from the second crossbeam 220 and therefore does not include a defined leading edge 275.

The dielectric layer 130 is disposed between the trace layer 120 and the base layer 110 and comprises a dielectric material such as polyimide. In some embodiments, a thickness of the dielectric layer 130 is in the range of about 5 µm to 25 µm, for example, 10 µm. The dielectric layer 130 includes a portion 280 that both underlies the leading edges 270 of the trace termination pads 265 and also overlies the heat sink portion 250, as can be seen in FIG. 3. The portion 280 of the dielectric layer 130 serves to electrically insulate the trace termination pads 265 from the heat sink portion 250. Additionally, during a soldering operation that electrically connects bonding pads on a transducer of a head to the conductive traces 260, as discussed below, the portion 280 also prevents molten solder from wetting the undersides of the trace termination pads 265. Accordingly, in some embodiments the portion 280 not only underlies the leading edges 270 of the trace termination pads 265 but also extends beyond the leading edges 270 in the direction of the leading end 225, as in FIGS. 1-3.

It should be noted that the portion 280 need not underlie the entirety of each trace termination pad 265 nor overlie the entirety of the heat sink portion 250. In the embodiment illustrated by FIG. 3, for example, a trailing edge 285 of the portion 280 is aligned with a trailing edge 290 of the trace termination pad 265, however, this alignment is not essential and the trailing edge 285 of the portion 280 can be disposed towards either the leading end 225 or the trailing end 215 of the flexure 100 relative to the trailing edge 290 of the trace termination pad 265. The trailing edge 285 of the portion 280 can even be aligned between the trace termination pads 265 and the heat sink portion 250 so that the portion 280 does not entirely underlie the trace termination pads 265 nor entirely overlie the heat sink portion 250. In these embodiments, however, sufficient dielectric material needs to be maintained between the trace termination pads 265 and the heat sink portion 250 to provide the necessary electrical insulation between the trace termination pads 265 and the heat sink portion 250, and to provide a barrier to molten solder during a soldering operation.

In the embodiment illustrated by FIG. 2 the portion 280 of the dielectric layer 130 is continuous beneath the six illustrated trace termination pads 265 and integral with other features of the dielectric layer 130. However, in other embodiments the portion 280 is an island that is separate from the other features of the dielectric layer 130. Further, the portion 280 is not limited to being a single feature but can also be comprised of a plurality of sub-portions. For instance, the portion 280 can comprise two separate sub-portions, where one sub-portion underlies the trace termination pads 265 on one side of the centerline, and a second sub-portion underlies all of the trace termination pads 265 on the other side of the centerline.

The dielectric layer 130 also includes a window 295. As can be seen from the top view of FIG. 1, the window 295 of the dielectric layer 130 and the first window 240 of the base layer 110 have a region 140 in common. As can also be seen from FIG. 1, each conductive trace 260 includes a curved section 150 that terminates in the trace termination pad 265. The curved sections 150 are distinguished from other curved portions of the conductive traces 260 seen in FIGS. 1 and 2 in that the curved sections 150 are disposed towards the trailing end 215 relative to a the trace termination pads 265. More specifically, a line 297 (FIG. 2) coincident with the leading edges 270 of the trace termination pads 265 serves to divide the curved sections 150 from the remainder of each conductive trace 260.

As can be seen in FIG. 1, the curved section 150 of each conductive trace 260 extends over the region 140. Accordingly, the curved sections 150 have a degree of flexibility to bend out of the plane of the trace layer 120 within the region 140. In this embodiment, the ability of the curved sections 150 to bend out of the plane of the trace layer 120, and in particular to bend above the plane, is facilitated by the window 295 in the dielectric layer 130. The first window 240 of the base layer 110 may also permit the curved sections 150 to bend out of the plane and particularly to bend below the plane of the trace layer 120.

It will be appreciated that the size of the first window 240 needs to be large enough to be able to accommodate the curved sections 150 of the conductive traces 260 and therefore the size of the first window 240 will depend on the number of conductive traces 260 in the trace layer 120, which can vary according to the particular embodiment. While the embodiment shown in FIG. 1 has six conductive traces 260, the number of conductive traces 260 can be as few as four or as many as 10 or more. Accordingly, in some embodiments, the size of the first window 240 can be in a range of 0.4 mm to 0.6 mm as measured along the longitudinal axis of the flexure 100 (FIG. 1), and in a range of 1 mm to 2 mm as measured perpendicular to the longitudinal axis of the flexure 100.

Figure 7:
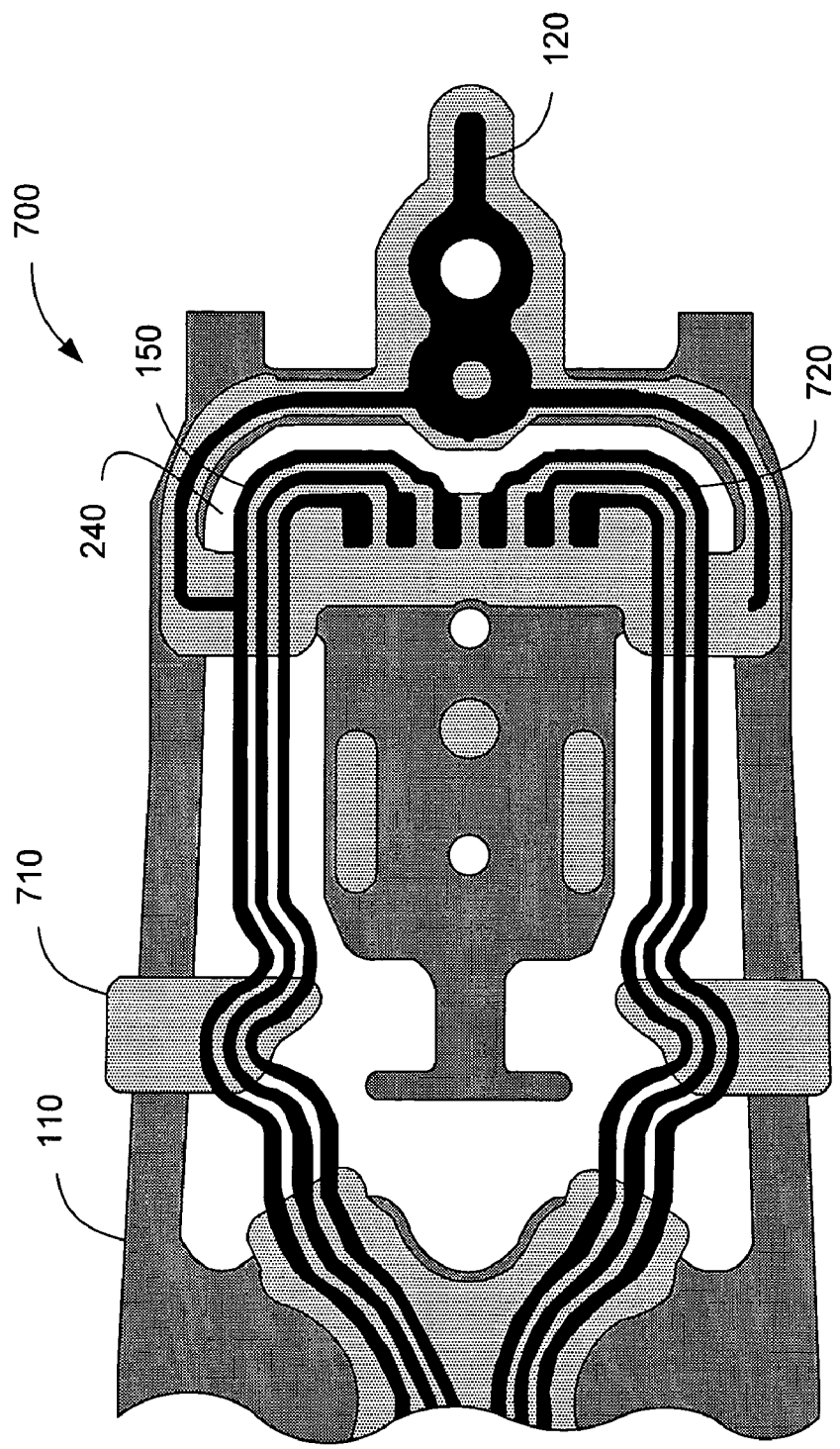
FIG. 7 shows a top view of an exemplary flexure for a head/gimbal assembly suspension according to another embodiment of the present invention.

FIG. 7 shows a top view of an exemplary HGA suspension 700 according to an additional embodiment of the present invention. In FIG. 7 a dielectric layer 710 includes a portion 720 analogous to portion 280 in FIG. 2, but additionally disposed at least partially beneath each curved section 150 of the conductive traces 260. In this embodiment the window 240 in the base layer 110 still underlies the curved sections 150. Due to the window 240 and the flexibility of the dielectric layer 710, the curved sections 150 are able to bend out of the plane of the trace layer 120. Providing the portion 720 of the dielectric layer 710 at least partially beneath the curved sections 150 of the conductive traces 260 allows the curved sections 150 to better withstand cleaning operations.

FIG. 4 shows a perspective view of the HGA 400 comprising the head 420 mounted to the HGA suspension 410. The head 420 includes bonding pads 430 that can be electrically connected to trace termination pads 440 by solder balls 450. For simplicity of illustration, the solder balls 450 are represented as wedges, however those skilled in the art will understand that the solder balls 450 assume more complex shapes as they wet the surfaces of the bonding pads 430 and the trace termination pads 440.

In some embodiments, the solder balls 450 comprise a solder suitable for use in solder ball bonding (SBB) or solder jet bonding (SJB) processes. Examples include tin-lead solders and lead-free equivalents such as lead-free tin solders. During soldering, a laser melts the solder. As the solder cools and solidifies the solder balls 450 contract, creating a force that pulls the trace termination pads 440 towards the bonding pads 430 on the transducer. The curved section 150 of each conductive trace 260 is able to alleviate the stress by bending out of the plane of the flexure 100 where the curved section 150 extends over the region 140. Benefits include a reduction of pitch static angle (PSA) change during soldering, leading to higher yields.

Additionally, the portion 280 of the dielectric layer 130 prevents molten solder from wetting the undersides of the trace termination pads 440, in particular by creating a barrier at the gap 460 between respective trace termination pads 440 and the bonding pads 430. The heat sink portion 250 provides a heat sink beneath the solder balls 450 that prevents the dielectric material of the portion 280 from burning.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A flexure for a head/gimbal assembly suspension comprising:
a metal base layer including
two outrigger beams,
a first crossbeam disposed between the two outrigger beams at a trailing end of the base layer,
a second crossbeam disposed between the two outrigger beams,
a base layer window disposed between the first and second crossbeams;
a flexure tongue, including a slider mounting surface, extending from the second crossbeam, and
a heat sink portion;
a trace layer disposed over the base layer and including a plurality of conductive traces, each conductive trace having a curved section that terminates in a trace termination pad, each trace termination pad having an edge disposed closest to the flexure tongue; and
a dielectric layer disposed between the trace and base layers and including
a portion underlying the edges of the trace termination pads and overlying the heat sink portion, and
a dielectric layer window disposed between the first and second crossbeams of the base layer;
wherein the curved section of each conductive trace extends over the base layer window.

2. The flexure of claim 1 wherein the metal base layer comprises stainless steel.

3. The flexure of claim 1 wherein the dielectric layer comprises polyimide.

4. The flexure of claim 1 wherein the trace layer comprises copper.

5. The flexure of claim 1 wherein the heat sink portion is attached to the second crossbeam.

6. The flexure of claim 1 wherein the heat sink portion is not attached to the second crossbeam.

7. The flexure of claim 6 wherein the heat sink portion comprises a tab extending from the second crossbeam opposite the flexure tongue.

8. The flexure of claim 1 wherein a thickness of the base layer is in the range of about 10 μm to 25 μm.

9. The flexure of claim 1 wherein a thickness of the trace layer is in the range of about 5 μm to 20 μm.

10. The flexure of claim 1 wherein a thickness of the dielectric layer is in the range of about 5 μm to 25 μm.

11. The flexure of claim 1 wherein a size of the base layer window can be in a range of 0.4 mm to 0.6 mm as measured along a longitudinal axis of the flexure, and in a range of 1 mm to 2 mm as measured perpendicular to the longitudinal axis.

12. The flexure of claim 1 wherein the curved section of each conductive trace extends at least partially over the dielectric layer window.

13. A head/gimbal assembly comprising:
a flexure including
a metal base layer having
two outrigger beams,
a first crossbeam disposed between the two outrigger beams at a trailing end of the base layer,
a second crossbeam disposed between the two outrigger beams,
a base layer window disposed between the first and second crossbeams;
a flexure tongue, including a slider mounting surface, extending from the second crossbeam, and
a heat sink portion;
a trace layer disposed over the base layer and including a plurality of conductive traces, each conductive trace having a curved section that terminates in a trace termination pad, each trace termination pad having an edge disposed closest to the flexure tongue; and a dielectric layer disposed between the trace and base layers and including
a portion underlying the edges of the trace termination pads and overlying the heat sink portion, and
a dielectric layer window disposed between the first and second crossbeams of the base layer;
wherein the curved section of each conductive trace extends over the base layer window; and
a head including
a slider mounted on the flexure tongue, and
a transducer having bonding pads, each bonding pad soldered to a respective trace termination pad by a solder ball.

14. The head/gimbal assembly of claim 13 wherein a composition of the solder ball includes tin.

15. The head/gimbal assembly of claim 13 wherein a curved portion of a conductive trace is bent out of the plane of the flexure where the curved section extends over the base layer window.

* * * * *